(12) United States Patent
Liu et al.

(10) Patent No.: US 10,009,915 B1
(45) Date of Patent: Jun. 26, 2018

(54) SYSTEMS AND METHODS FOR CROSS SCHEDULING TRANSMISSIONS FROM AN ACCESS NODE

(71) Applicant: Sprint Spectrum LP, Overland Park, KS (US)

(72) Inventors: Chunmei Liu, Great Falls, VA (US); Hemanth Pawar, Brambleton, VA (US); Krishna Sitaram, Chantilly, VA (US); Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 347 days.

(21) Appl. No.: 14/531,210

(22) Filed: Nov. 3, 2014

(51) Int. Cl.
*H04W 72/04* (2009.01)
*H04W 72/12* (2009.01)

(52) U.S. Cl.
CPC ... *H04W 72/1263* (2013.01); *H04W 72/0406* (2013.01)

(58) Field of Classification Search
CPC .............. H04W 72/1263; H04W 72/0406
See application file for complete search history.

(56) References Cited

U.S. PATENT DOCUMENTS

| | | | |
|---|---|---|---|
| 9,332,547 B1 * | 5/2016 | Ghavami | H04W 72/0453 |
| 2013/0258864 A1 | 10/2013 | Chen et al. | |
| 2013/0343239 A1 | 12/2013 | Damnjanovic et al. | |
| 2014/0126485 A1 | 5/2014 | Chen et al. | |
| 2015/0351096 A1 * | 12/2015 | Sidhu | H04W 72/0453 370/329 |
| 2016/0050683 A1 * | 2/2016 | Gupta | H04W 24/02 370/329 |

* cited by examiner

*Primary Examiner* — Yemane Mesfin
*Assistant Examiner* — Henry Baron

(57) ABSTRACT

Systems and methods are described for cross scheduling transmissions from an access node. Data may be communicated between an access node and a wireless device over a first frequency band. A first application and a second application associated with the wireless device may be determined, where each of the applications comprises an application type. Based on the application type one of the first frequency band and a second frequency band may be selected for the first application and the second application, where the selected frequency bands are different. Transmissions associated with the first application may then be scheduled over the frequency band selected for the first application and transmissions associated with the second application may then be scheduled over the frequency band selected for the second application.

16 Claims, 7 Drawing Sheets

SYSTEMS AND METHODS FOR CROSS SCHEDULING TRANSMISSIONS FROM AN ACCESS NODE

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load (e.g., load above a threshold). For example, a communication link may experience a large amount of data traffic and consequently the efficiency of the system may suffer. Accordingly, a system that effectively balances load and considers utilization of system resources may provide an efficient service to users.

OVERVIEW

Systems and methods are described for cross scheduling transmissions from an access node. Data may be communicated between an access node and a wireless device over a first frequency band. A first application and a second application associated with the wireless device may be determined, where each of the applications comprises an application type. Based on the application type one of the first frequency band and a second frequency band may be selected for the first application and the second application, where the selected frequency bands are different. Transmissions associated with the first application may then be scheduled over the frequency band selected for the first application and transmissions associated with the second application may then be scheduled over the frequency band selected for the second application.

DETAILED DESCRIPTION

Figure 1:
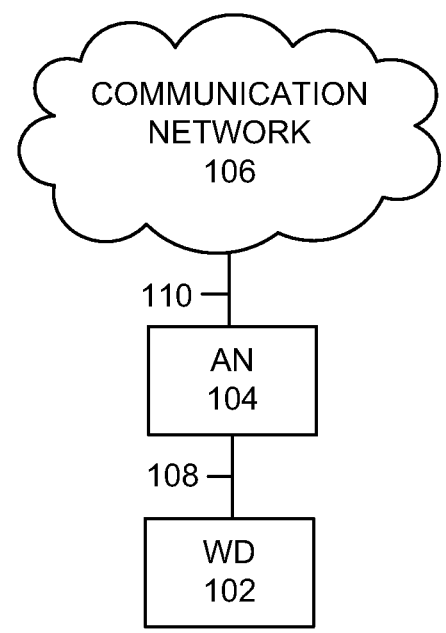
FIG. 1 illustrates an exemplary communication system to cross schedule transmissions from an access node.

FIG. 1 illustrates an exemplary communication system 100 to cross schedule transmissions from an access node comprising wireless device 102, access node 104, communication network 106, and communication links 108 and 110. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104, any number of wireless devices can be implemented.

Access node 104 is a network node capable of providing wireless communications to wireless device 102, and can be, for example, a base transceiver station, a radio base station, and an eNodeB device. Access node 104 may communicate with communication network 106 over communication link 110. Although only access node 104 is illustrated in FIG. 1, wireless device 102 (and other wireless devices not depicted) can be in communication with a plurality of access nodes and/or small cells. The plurality of access nodes and/or small cells can be associated with different networks and can support different communication protocols and radio access technologies.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 108 and 110 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
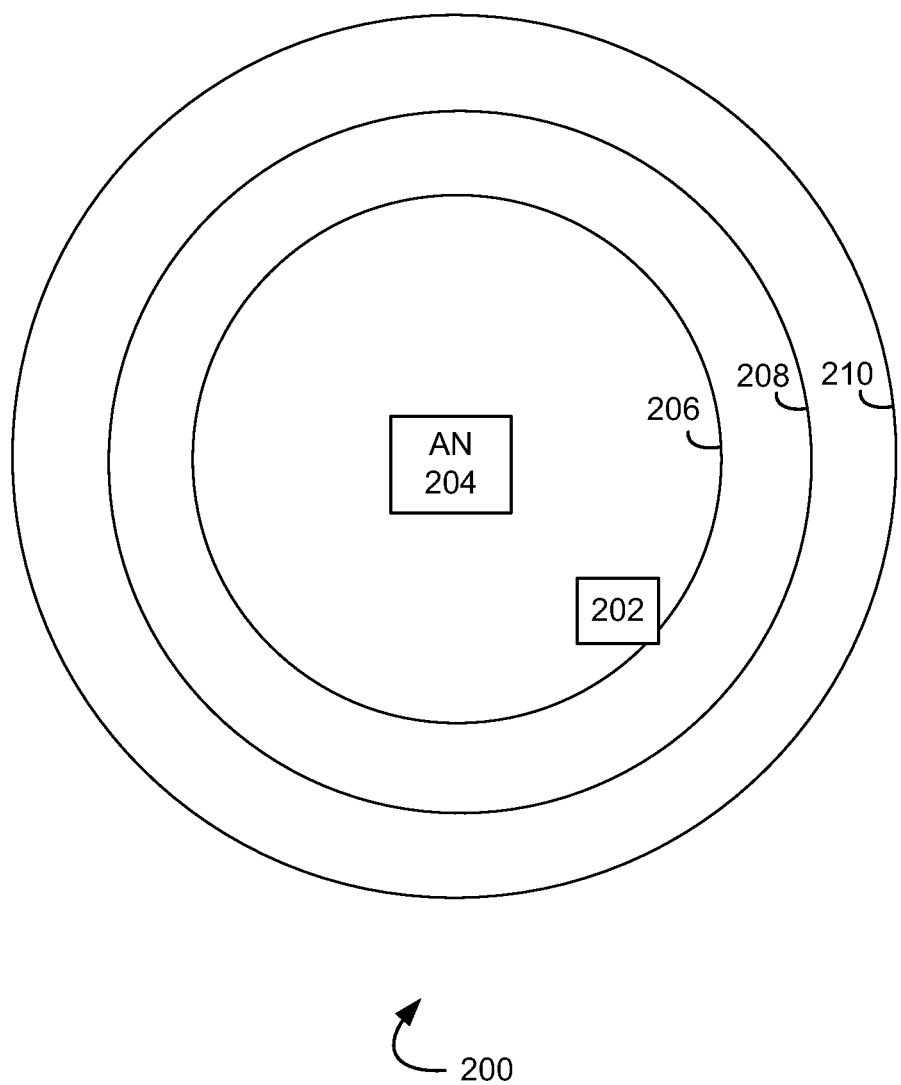
FIG. 2 illustrates another exemplary communication system to cross schedule transmissions from an access node.

FIG. 2 illustrates an exemplary communication system 200 for cross scheduling transmissions from an access node.

System 200 comprises wireless device 202, access node 204, and signal areas 204, 206, and 208. Wireless device 202 may comprise a wireless device similar to wireless device 102 and access node 204 may comprise an access node similar to access node 104.

In an embodiment, system 200 may use a plurality of carriers in order to provide wireless communication services. A plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers.

In an embodiment, a signal area may comprise an area around an access node where a wireless device may detect wireless signals transmitted from the access node (e.g., a references signal) at a signal level above a threshold. In this example, access nodes 204 may comprise signal areas 206, 208, and 210, such that each signal area may transmit wireless signals over one or more particular band classes (BCs). A band class may comprise a block of wireless spectrum. In an embodiment, a frequency band may comprise a band class. Examples of such band classes may be blocks of spectrum at 800 MHz, 1,900 MHz, and 2,500 MHz In operation, access node 204 may establish communication with wireless device 202 such that access node 204 provides the wireless device access to a communication network (e.g., communication network 106). Access node 204 may schedule transmissions (e.g., physical resource block transmissions) to wireless devices in communication with the access node. For example, a packet may be received at access node 204 that is associated with wireless device 202, and access node 204 may schedule transmissions to wireless device 202 to communicate the data from the received packet.

In an embodiment, access node 204 may transmit wireless signals over signal area 206 using a first band class, over signal area 208 using a second band class, and over signal area 210 using a third band class. Signals areas 206, 208, and 210 may comprise different characteristics, for instances, due to various signal conditions provided by the different band classes and/or due to particular technologies used to implement a band class. For example, the first band class may comprise a greater frequency than the third band class, and this discrepancy may cause signal area 210 to be larger than signal area 206. In another example, system 200 may communicate using a first radio access technology (e.g., LTE) over the first band class and may communicate using a second radio access technology (e.g., CDMA) over the third band class. Accordingly, the wireless service provided to wireless device 202 when communicating using the first band class may comprise different characteristics (e.g., reliability, data rate, error rate, and the like) from the wireless service provided to the wireless device when communicating using the third band class. In an embodiment, signals areas 206, 208, 210 may comprise any suitable size and network characteristics. A system that considers the characteristics of band classes (e.g., frequency bands) when scheduling data transmissions may provide enhanced wireless services to users of the system.

Systems and methods are described for cross scheduling transmissions from an access node. Data may be communicated between an access node and a wireless device over a first frequency band. A first application and a second application associated with the wireless device may be determined, where each of the applications comprises an application type. Based on the application type one of the first frequency band and a second frequency band may be selected for the first application and the second application, where the selected frequency bands are different. Transmissions associated with the first application may then be scheduled over the frequency band selected for the first application and transmissions associated with the second application may then be scheduled over the frequency band selected for the second application.

Figure 3:
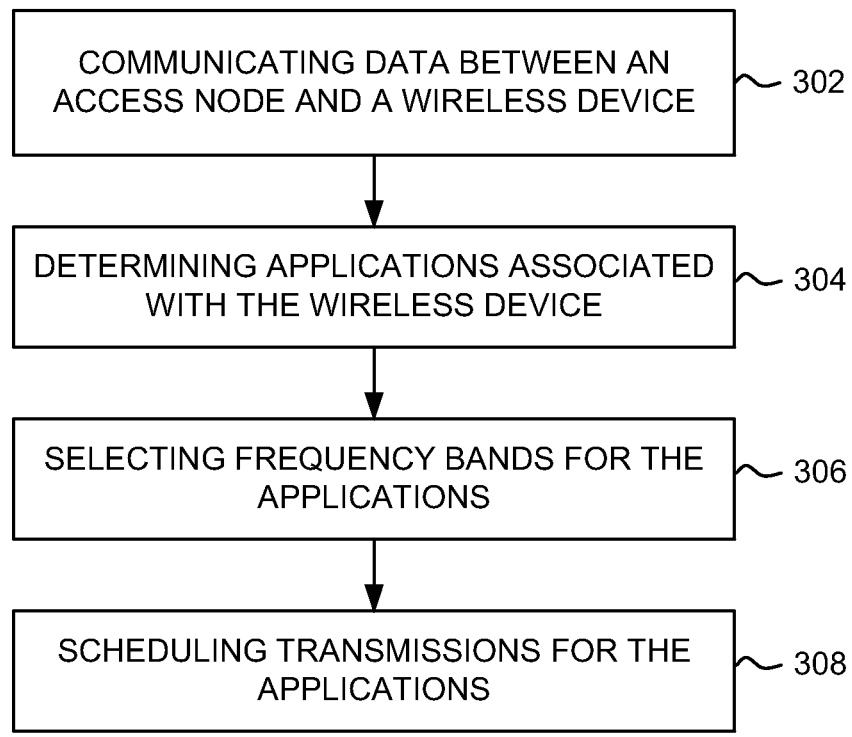
FIG. 3 illustrates an exemplary method for cross scheduling transmissions from an access node.

FIG. 3 illustrates an exemplary method for cross scheduling transmissions from an access node. The method will be discussed with reference to the exemplary communication system 200 illustrated in FIG. 2, however, the method can be implemented with any suitable communication system.

Referring to FIG. 3, at step 302, data may be communicated between an access node and a wireless device over a first frequency band. For example, data may be communicated between access node 204 and wireless device 202 using a first frequency band. The first frequency band may comprise a first band class.

At step 304, it may be determined that a first application and a second application are associated with the wireless device, wherein the applications comprise an application type. For example, it may be determined that a first application and a second application are associated with wireless device 202. The first application and the second application may be running on wireless device 202 and/or may be communicating with access node 204. The first application and second application may be determined using packet inspection. For example, access node 204 may perform packet inspection (e.g., deep packet inspection (DPI)) and may determine that the first application and the second application are associated with wireless device 202 (e.g., are running on wireless device 202). Any other suitable method may be used to determine that the first application and the second application are associated with wireless device 202.

In an embodiment, the first application and the second application may comprise an application type. For example, the applications may comprise real-time communication applications, voice applications, streaming video applications, web browsing applications, email applications, and the like.

At step 306, one of a first frequency band and a second frequency band may be selected for the first application and the second application, where the selected frequency bands are different. In this example, the first frequency band may comprise a first band class (e.g. 2500 Mhz) and the second frequency band may comprise a second band class (e.g., 1900 Mhz).

At step 308, transmissions associated with the first application may be scheduled over the frequency band selected for the first application and transmissions associated with the second application may be scheduled over the frequency band selected for the second application. In an embodiment, the first frequency band (e.g., first band class) may be selected for the first application and the second frequency band (e.g., second band class) may be selected for the second application. In this example, access node 204 may schedule transmissions associated with the first application over the first frequency band and transmissions associated with the second application over the second frequency band. In an embodiment, transmissions associated with the first application may comprise transmissions for the first application running on wireless device 202 and transmissions associated with the second application may comprise transmissions for the second application running on wireless device 202. Transmission may comprise the transmission of one or more physical resources blocks (PRBs).

Figure 4:
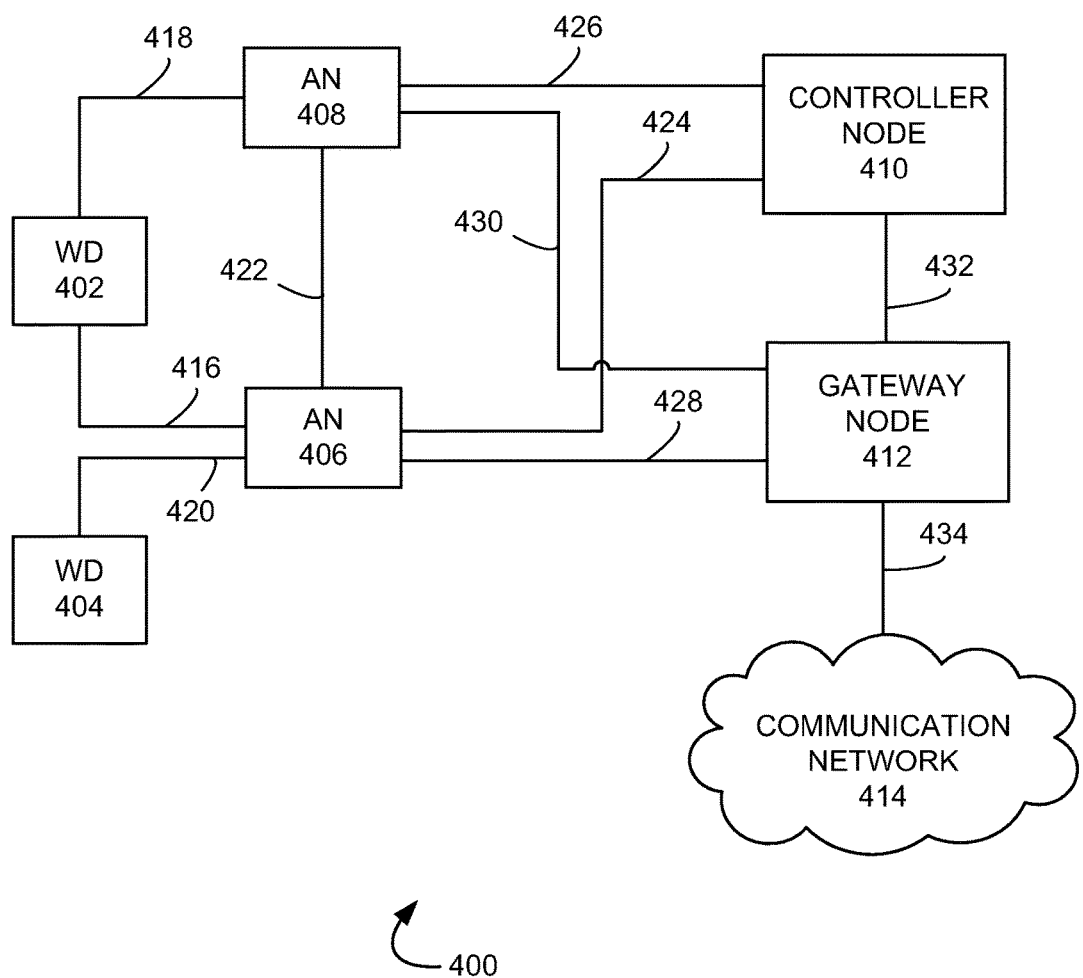
FIG. 4 illustrates another exemplary system to cross schedule transmissions from an access node.

FIG. 4 illustrates another exemplary communication system 400 to cross schedule transmissions from an access node. Communication system 400 may comprise wireless device 402, access node 404 and 406, controller node 408, gateway node 410, communication network 412, and communication links 416, 418, 420, 422, 424, 426, 428, 430, 432, and 434. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402 and 404 can be any devices configured to communicate over communication system 400 using a wireless communication link. For example, wireless devices 402 and 404 can include a cell phone, a smart phone, a computing platform such as a laptop, palmtop, or a tablet, a personal digital assistant, or an internet access device, and combinations thereof.

Access nodes 406 and 408 are network nodes capable of providing wireless communications to wireless devices 402 and 404, and can be, for example, a base transceiver station, a radio base station, or an eNodeB device. In an embodiment, access node 406 can comprise a serving access node for wireless devices 402 and 404. Access nodes 406 and 408 may communicate with controller node 410 over communication links 424 and 426, respectively, and with gateway node 412 over communication links 428 and 430, respectively. Access nodes 406 and 408 may also communicate directly with each other over communication link 422.

Controller node 410 can be any network node configured to manage services within system 400. Controller node 410 may provide other control and management functions for system 400. The controller node 410 can be a single device having various functions or a plurality of devices having differing functions. For example, controller node 410 can include at least one of a multi-cell/multicast coordination entity (MCE), a mobility management entity (MME), a mobile switching center (MSC), a radio network controller (RNC), and a combination thereof.

Controller node 410 can comprise a processor and associated circuitry to execute or direct the execution of computer-readable instructions to obtain information. Controller node 410 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 410 can receive instructions and other input at a user interface. Controller node 410 can comprise a processor and associated circuitry to execute or direct the execution of computer-readable instructions to obtain information.

Gateway node 412 is a network element which can comprise a processor and associated circuitry to execute or direct the execution of computer-readable instructions. Gateway node 412 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 412 can provide instructions to access nodes 406 and 408 related to channel selection in communications with wireless devices 402 and 404. For example, gateway node 412 can comprise at least one of a serving gateway (SGW), a packet data network gateway (PDNGW), a cellular gateway (CGW), and a combination thereof.

Communication network 414 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 414 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 414 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 416, 418, 420, 422, 424, 426, 428, 430, 432, and 434 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 406 and 408, controller node 410, gateway node 412, and communication network 414 which are omitted for clarity, including additional processing nodes, routers, gateways, and physical and/or wireless data links for carrying data among the various network elements. In an embodiment, any of controller node 410, gateway node 412, and one or more modules of access nodes 406 and/or 408 may perform all or parts of the methods of FIGS. 3 and 5.

In an embodiment, system 400 may use a plurality of carriers in order to provide wireless communication services. A plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers.

In an embodiment, a signal area may comprise an area around an access node where a wireless device may detect wireless signals transmitted from the access node (e.g., a references signal) at a signal level above a threshold. In this example, access nodes 406 may comprise a first signal area, a second signal area, and a third signal area, such that each signal area may transmit wireless signals over one or more particular band classes (BCs). The signal areas may be similar to signal areas 206, 208, and 210 illustrated in FIG. 2.

In operation, access node 406 may establish communication with wireless device 402 such that access node 406 provides the wireless device access to a communication network (e.g., communication network 414). Access node 406 may schedule transmissions (e.g., physical resource block transmissions) to wireless devices in communication with the access node. For example, a packet may be received at access node 406 that is associated with wireless device 402, and access node 406 may schedule transmissions to wireless device 402 to communicate the data from the received packet.

In an embodiment, access node 406 may transmit wireless signals over the first signal area using a first band class, over the second signal area using a second band class, and over the third signal area using a third band class. The signal areas may comprise different characteristics, for instances, due to various signal conditions provided by the different band classes and/or due to particular technologies used to implement a band class. For example, the first band class may comprise a greater frequency than the third band class, and this discrepancy may cause the third signal area to be larger than the firs signal area. In another example, system 400 may communicate using a first radio access technology (e.g., LTE) over the first band class and may communicate using a second radio access technology (e.g., CDMA) over the third band class. Accordingly, the wireless service provided to wireless device 402 when communicating using the first band class may comprise different characteristics (e.g., reliability, data rate, error rate, and the like) from the wireless service provided to the wireless device when communicating using the third band class. A system that considers the characteristics of band classes (e.g., frequency bands) when scheduling data transmissions may provide enhanced wireless services to users of the system.

Systems and methods are described for cross scheduling transmissions from an access node. Data may be communicated between an access node and a wireless device over a first frequency band. A first application and a second application associated with the wireless device may be determined, where each of the applications comprises an application type. Based on the application type one of the first frequency band and a second frequency band may be selected for the first application and the second application, where the selected frequency bands are different. Transmissions associated with the first application may then be scheduled over the frequency band selected for the first application and transmissions associated with the second application may then be scheduled over the frequency band selected for the second application.

Figure 5:
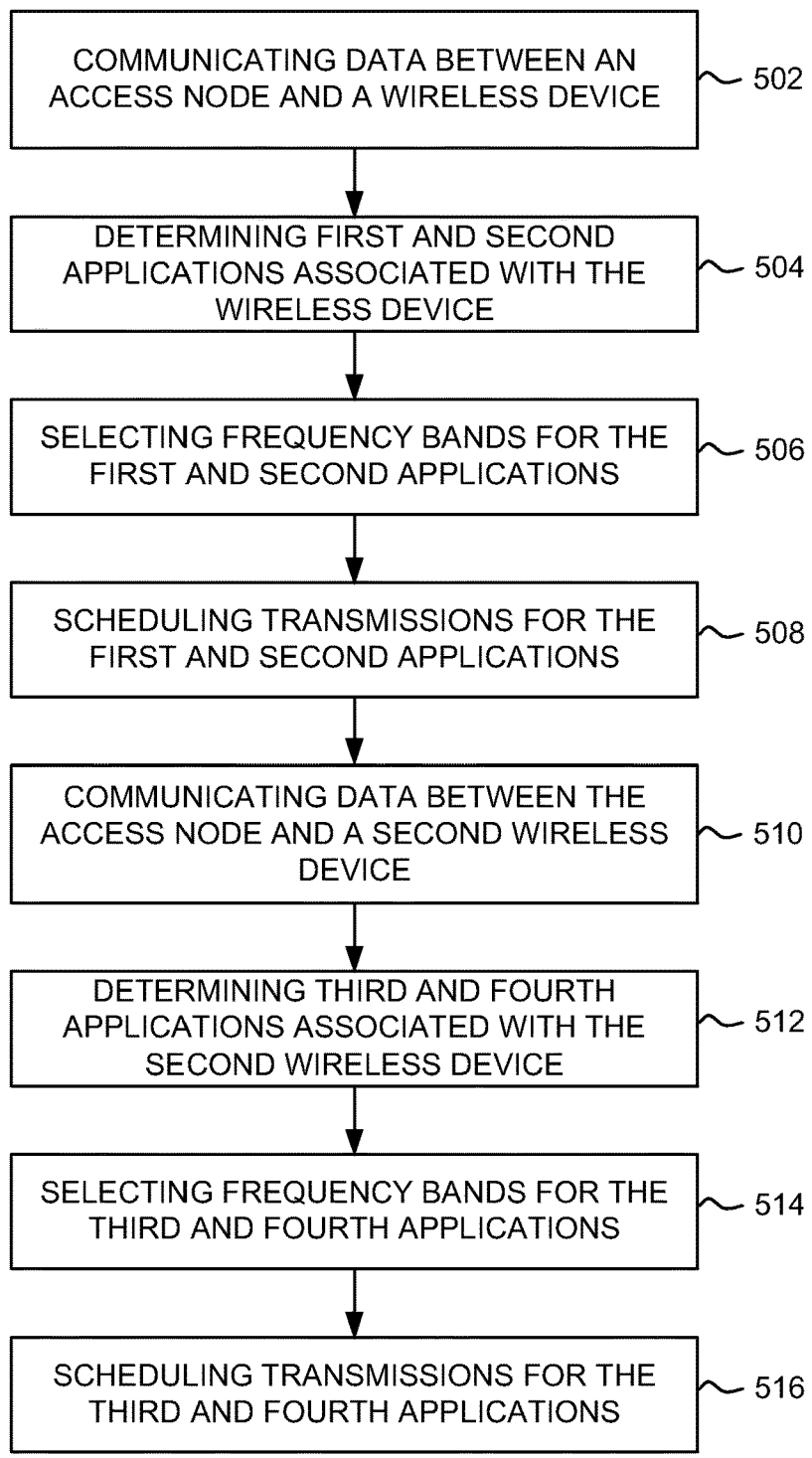
FIG. 5 illustrates another exemplary method for cross scheduling transmissions from an access node.

FIG. 5 illustrates an exemplary method for cross scheduling transmissions from an access node. The method will be discussed with reference to the exemplary communication system 400 illustrated in FIG. 4, however, the method can be implemented with any suitable communication system.

Referring to FIG. 5, at step 502, data may be communicated between an access node and a wireless device over a first frequency band. For example, data may be communicated between access node 406 and wireless device 402 using a first frequency band. The first frequency band may comprise a first band class.

At step 504, it may be determined that a first application and a second application are associated with the wireless device, wherein the applications comprise an application type. For example, it may be determined that a first application and a second application are associated with wireless device 402. The first application and the second application may be running on wireless device 402 and/or may be communicating with access node 406.

In an embodiment, the first application and second application may be determined using packet inspection. For example, access node 406 may perform packet inspection (e.g., deep packet inspection (DPI)) on packets received at the access node, including packets associated with wireless device 402 (e.g., transmitted from the wireless device or transmitted to the wireless device). The first application and the second application may be identified based on the inspection. In an embodiment, access node 406 may inspect downstream packets (e.g., packets for wireless device 402) or upstream packets (e.g., packets from wireless device 402) in order to determine that the applications are associated with wireless device 402 (e.g., running on wireless device 402). Any other suitable method may be used to determine that the first application and the second application are associated with wireless device 402.

In an embodiment, the first application and the second application may comprise an application type. For example, the applications may comprise real-time communication applications, voice applications, streaming video applications, web browsing applications, email applications, and the like. In an embodiment the applications types may comprise a voice application, a first data application that is associated with data throughput above a threshold, and a second data application that is associated with data throughput below a threshold. For example, a streaming video application may be associated with a data throughput greater than a threshold, and therefore may comprise a first data application type, while a web browser application may be associated with a data throughput less than a threshold, and therefore may comprise a second data application type.

At step 506, one of a first frequency band and a second frequency band may be selected for the first application and the second application, where the selected frequency bands are different. In this example, the first frequency band may comprise a first band class (e.g. 2500 Mhz) and the second frequency band may comprise a second band class (e.g., 1900 Mhz).

In an embodiment, the first frequency band (e.g., first band class) may be associated with the voice application type and the second frequency band (e.g., second band class) may be associated with the first data application type. In another embodiment, the first frequency band may comprise greater coverage than the second frequency band. For example, a coverage area for the first frequency band may be illustrated by signal area 206 of FIG. 2 and a coverage area for the second frequency band may be illustrated by signal area 210 of FIG. 2. In an example, the second frequency band may comprise greater average data throughput than the first frequency band. For example, system 400 may implement a first radio access technology (e.g., LTE) over the first frequency band and may implement a second radio access technology (e.g., CDMA) over the second frequency band, where the first radio access technology may provide greater average throughput than the second radio access technology.

In an embodiment, when a frequency band is associated with an application type, the frequency band may be selected for an application of that application type. In another embodiment, a frequency band may be selected for an application type based on the characteristics for that frequency band. For example, where the first frequency band comprises a greater coverage than the second frequency band, the first frequency band may be selected for the voice application type. Where the second frequency band comprises a greater data throughput than the first frequency band, the second frequency band may be selected for the first data application type.

At step 508, transmissions associated with the first application may be scheduled over the frequency band selected for the first application and transmissions associated with the second application may be scheduled over the frequency band selected for the second application. In an embodiment, the second frequency band (e.g., second band class) may be selected for the first application and the first frequency band (e.g., first band class) may be selected for the second application. In this example, access node 406 may schedule transmissions associated with the first application over the second frequency band and transmissions associated with the second application over the first frequency band. In an embodiment, transmissions associated with the first application may comprise transmissions for the first application running on wireless device 402 and transmissions associated with the second application may comprise transmissions for the second application running on wireless device 402. Transmission may comprise the transmission of one or more physical resources blocks (PRBs).

In an embodiment, the first frequency band may comprise a primary frequency band for wireless device 402. For example, the first frequency band may be assigned to wireless device 402 (e.g., by an element of system 400) for communication with access node 406. In this embodiment, transmissions for the first application may be scheduled over the second frequency band using a control channel of the first frequency band. In an example where the first frequency band implements LTE, the control channel may comprise a Physical Downlink Control Channel (PDCCH). Any other suitable control channel may be used.

Figure 6:
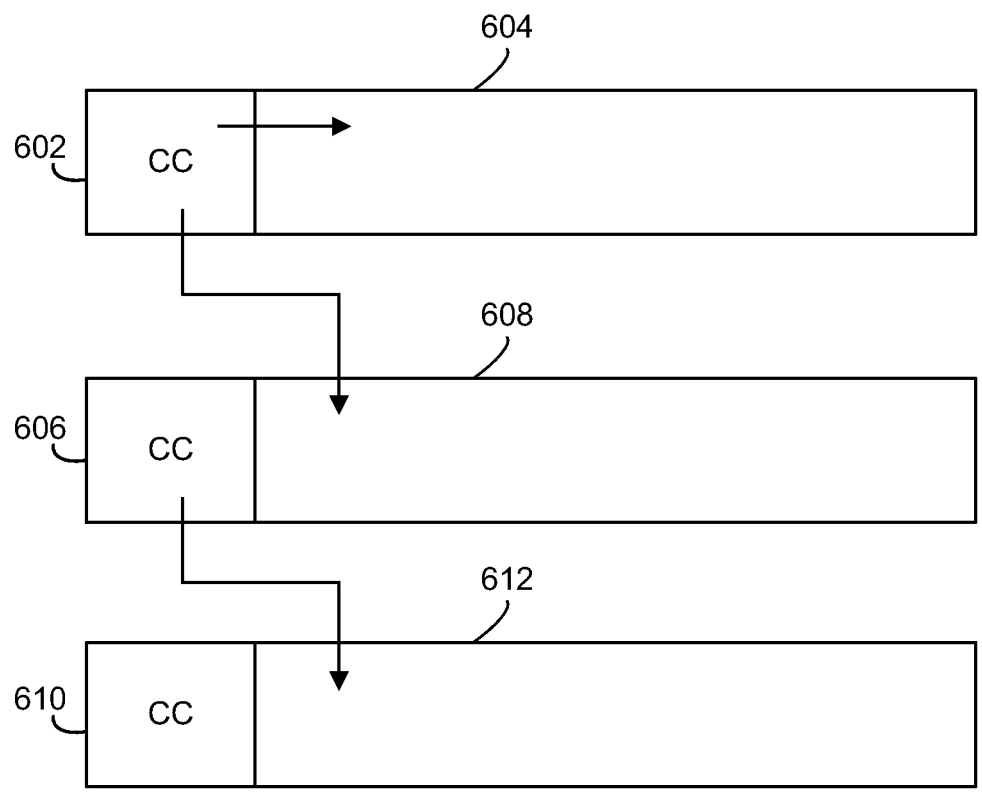
FIG. 6 illustrates exemplary data channels for cross scheduling transmissions from an access node.

FIG. 6 illustrates data channels used to implement cross carrier scheduling. In this example, data channel 602 comprises a control channel for the first frequency band, data channel 604 comprises data channels for the first frequency band, data channel 606 comprises a control channel for the second frequency band, data channel 608 comprises data channels for the second frequency band, data channel 610 comprises a control channel for a third frequency band, and data channel 612 comprises data channels for the third frequency band. In an embodiment, a control channel for one of the frequency bands may be used to schedule data transmissions over another frequency band. In the above example, the control channel for the first frequency band, 602, may be used to schedule data transmissions using the data channel for the second frequency band, 608. The control channel for the first frequency band, 602, may also be used to schedule data transmissions using the data channel for the first frequency band, 604. In an embodiment, the control channel for the default frequency band for a wireless device may be used to instruct the wireless device to communicate using the data channel for the first frequency band, 604, and the data channel for the second frequency band, 608.

In another embodiment where the default frequency band for wireless device 402 comprises the second frequency band, the control channel for the second frequency band, 606, may be used to schedule data transmissions using the data channel for the first frequency band, 604. The control channel for the second frequency band, 606, may also be used to schedule data transmissions using the data channel for the second frequency band, 608.

At step 510, data may be communicated between an access node and a second wireless device over the second frequency band. For example, data may be communicated between access node 406 and wireless device 404 using the second frequency band. In this example, the second frequency band may comprise a primary frequency band for wireless device 404. For example, the second frequency band may be assigned to wireless device 404 (e.g., by an element of system 400) for communication with access node 406.

At step 512, it may be determined that a third application and a fourth application are associated with the second wireless device, wherein the applications comprise an application type. For example, it may be determined that a third application and a fourth application are associated with wireless device 404. The third application and the fourth application may be running on wireless device 404 and/or may be communicating with access node 406.

In an embodiment, the third application and fourth application may be determined using packet inspection. For example, access node 406 may perform packet inspection (e.g., deep packet inspection (DPI)) on packets associated with wireless device 404 (e.g., transmitted from the wireless device or transmitted to the wireless device) and may identify the third application and the fourth application based on the inspection. Any other suitable method may be used to determine that the first application and the second application are associated with wireless device 404.

In an embodiment, the third application and the fourth application may comprise an application type. For example, the applications may comprise real-time communication applications, voice applications, streaming video applications, web browsing applications, email applications, and the like. In an embodiment the applications types may comprise a voice application, a first data application that is associated with data throughput above a threshold, and a second data application that is associated with data throughput below a threshold.

At step 514, one of a first frequency band, a second frequency band, and a third frequency band may be selected for the third application and the fourth application, where the selected frequency bands are different. In this example, the first frequency band may comprise a first band class (e.g. 2500 Mhz), the second frequency band may comprise a second band class (e.g., 1900 Mhz), and the third frequency band may comprise a third band class (e.g. 800 Mhz).

In an embodiment, the first frequency band (e.g., first band class) may be associated with the voice application type, the second frequency band (e.g., second band class) may be associated with the first data application type, and the third frequency band (e.g., third band class) may be associated with the second data application type.

In an embodiment, when a frequency band is associated with an application type, the frequency band may be selected for an application of that application type. In another embodiment, a frequency band may be selected for an application type based on the characteristics for that frequency band. For example, where the first frequency band comprises a greater coverage than the second frequency band, the first frequency band may be selected for the voice application type. Where the second frequency band comprises a greater data throughput than the first frequency band, the second frequency band may be selected for the first data application type.

At step 516, transmissions associated with the third application may be scheduled over the frequency band selected for the third application and transmissions associated with the fourth application may be scheduled over the frequency band selected for the fourth application. In an embodiment, the third frequency band (e.g., third band class) may be selected for the third application and the second frequency band (e.g., second band class) may be selected for the fourth application. In this example, access node 406 may schedule transmissions associated with the third application over the third frequency band and transmissions associated with the fourth application over the second frequency band. In an embodiment, transmissions associated with the third application may comprise transmissions for the third application running on wireless device 404 and transmissions associated with the fourth application may comprise transmissions for the fourth application running on wireless device 404.

In an embodiment, the second frequency band may comprise a primary frequency band for wireless device 404. In this embodiment, transmissions for the third application may be scheduled over the third frequency band using a control channel of the second frequency band. In an example where the second frequency band implements LTE, the control channel may comprise a Physical Downlink Control Channel (PDCCH). Any other suitable control channel may be used.

With reference to FIG. 6, in the above example, the control channel for the second frequency band, 606, may be used to schedule data transmissions using the data channel for the third frequency band 612. The control channel for the second frequency band, 606, may also be used to schedule data transmissions using the data channel for the second frequency band, 608, and data channel for the first frequency band 604. In an embodiment, the control channel for the default frequency band for a wireless device may be used to instruct the wireless device to communicate using the data channel for the first frequency band, 604, the data channel for the second frequency band, 608, and the data channel for the third frequency band 612.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
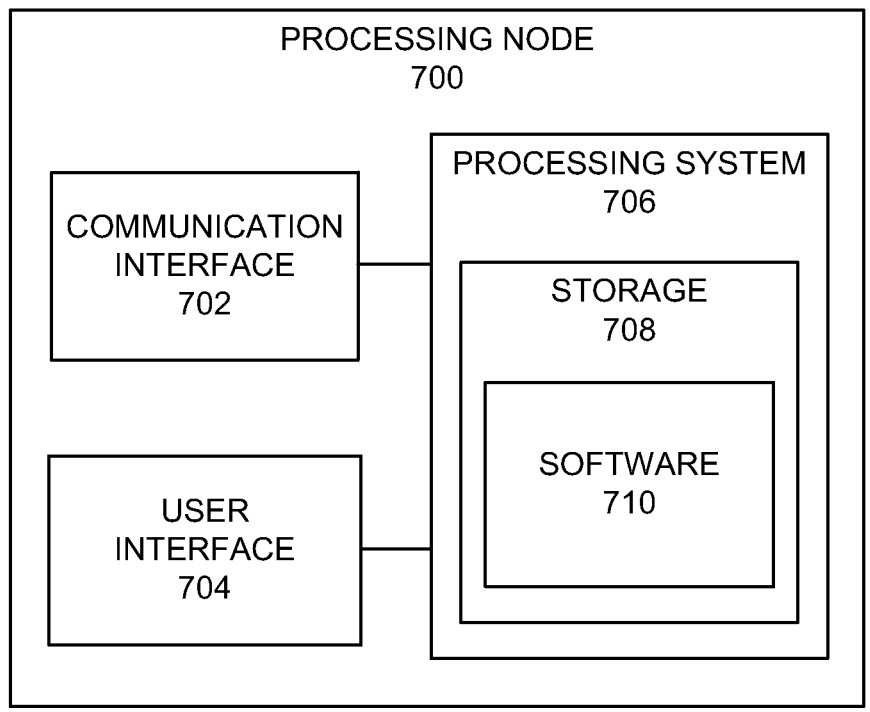
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 410 and gateway node 412. Processing node 700 can also be an adjunct or component of a network element, such as an element of access nodes 104 or 406 and the like. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for cross scheduling transmissions from an access node, the method comprising:
communicating data between an access node and a wireless device over a first frequency band, wherein the first frequency band comprises a primary frequency band for the wireless device;
determining a first application and a second application associated with the wireless device, wherein each of the applications comprises an application type;

selecting, based on the application type, the first frequency band for the second application and a second frequency band for the first application, wherein each of the first and second frequency bands are different from each other; and scheduling transmissions associated with the first application to the wireless device over the second frequency band using a control channel of the first frequency band, and transmissions associated with the second application to the wireless device over the first frequency band.

2. The method of claim 1, wherein the application types may comprise a voice application, a first data application that is associated with data throughput above a threshold, and a second data application that is associated with data throughput below a threshold.

3. The method of claim 2, wherein the first frequency band is associated with the voice application type and the second frequency band is associated with the first data application type.

4. The method of claim 1, wherein the first frequency band comprises greater coverage than the second frequency band and the second frequency band comprises greater average data throughput than the first frequency band.

5. The method of claim 1, further comprising:

communicating data between the access node and a second wireless device over the second frequency band;

determining a third application and a fourth application associated with the second wireless device, wherein each of the applications comprises an application type;

selecting, based on the application type, one of the first frequency band, the second frequency band, and third frequency band for the third application and the fourth application, wherein the selected frequency bands are different; and scheduling transmissions associated with the third application to the second wireless device over the frequency band selected for the third application and transmissions associated with the fourth application to the second wireless device over the frequency band selected for the fourth application.

6. The method of claim 5, wherein the application types may comprise a voice application, a first data application that is associated with data throughput above a threshold, and a second data application that is associated with data throughput below a threshold.

7. The method of claim 6, wherein the first frequency band is associated with the voice application type, the second frequency band is associated with the first data application type, and the third frequency band is associated with the second data application type.

8. The method of claim 5, wherein the second frequency band comprises a primary frequency band for the second wireless device and the third frequency band is selected for the third application.

9. The method of claim 8, further comprising:

scheduling transmissions for the third application over the third frequency band using a control channel of the second frequency band.

10. A system for cross scheduling transmissions from an access node, the system comprising:

a processing node with a processor configured to:

communicate data between an access node and a wireless device over a first frequency band, wherein the first frequency band comprises a primary frequency band for the wireless device;

determine a first application and a second application associated with the wireless device, wherein each of the applications comprises an application type;

select, based on the application type, one of the first frequency band for the second application and a second frequency band for the first application, wherein each of the first and second frequency bands are different from each other; and schedule transmissions associated with the first application to the wireless device over the second frequency band using a control channel of the first frequency band, and transmissions associated with the second application to the wireless device over the first frequency band.

11. The system of claim 10, wherein the application types may comprise a voice application, a first data application that is associated with data throughput above a threshold, and a second data application that is associated with data throughput below a threshold.

12. The system of claim 11, wherein the first frequency band is associated with the voice application type and the second frequency band is associated with the first data application type.

13. The system of claim 10, wherein the first frequency band comprises greater coverage than the second frequency band and the second frequency band comprises greater average data throughput than the first frequency band.

14. The system of claim 10, wherein the processing node is further configured to:

communicating data between the access node and a second wireless device over the second frequency band;

determining a third application and a fourth application associated with the second wireless device, wherein each of the applications comprises an application type;

selecting, based on the application type, one of the first frequency band, the second frequency band, and third frequency band for the third application and the fourth application, wherein the selected frequency bands are different; and scheduling transmissions associated with the third application to the second wireless device over the frequency band selected for the third application and transmissions associated with the fourth application to the second wireless device over the frequency band selected for the fourth application.

15. The system of claim 14, wherein the application types may comprise a voice application, a first data application that is associated with data throughput above a threshold, and a second data application that is associated with data throughput below a threshold.

16. The system of claim 15, wherein the first frequency band is associated with the voice application type, the second frequency band is associated with the first data application type, and the third frequency band is associated with the second data application type.

* * * * *